United States Patent

Van Niel

[15] 3,678,798
[45] July 25, 1972

[54] FASTENING DEVICE
[72] Inventor: Clarence R. Van Niel, North Olmsted, Ohio
[73] Assignee: Eaton Corporation, Cleveland, Ohio
[22] Filed: Dec. 29, 1969
[21] Appl. No.: 888,232

[52] U.S. Cl. ............................................................ 85/81
[51] Int. Cl. ..................................................... F16b 13/04
[58] Field of Search ............... 85/81, 72, 84, 82; 24/73 P, 24/73 PF

[56] References Cited

UNITED STATES PATENTS

| | | | |
|---|---|---|---|
| 2,384,918 | 9/1945 | Houk | 85/84 |
| 2,941,439 | 6/1960 | Rapata | 85/72 |
| 3,417,438 | 12/1968 | Schuplin | 85/72 |
| 3,319,918 | 5/1967 | Rapata | 85/82 |
| 3,492,910 | 2/1970 | Van Niel et al. | 85/81 |

FOREIGN PATENTS OR APPLICATIONS

| | | | |
|---|---|---|---|
| 1,036,423 | 1/1966 | Great Britain | 24/73 PF |

Primary Examiner—Edward C. Allen
Attorney—Teare, Teare & Sammon

[57] ABSTRACT

A fastening device for insertion through an aperture in a support member including a deformable body adapted for mounting with the support member. A plunger member is initially integrally mounted on the body member. The body member includes an opening therein and the plunger member is mounted in superposed relation on the body member adapted for insertion into the opening. The plunger member includes cam-like locking members disposed adjacent the integral connection between the body member and plunger member. Cam-like projections are disposed within the opening in the body member for snap-action interlocking engagement with the locking members. The plunger member has a configuration generally complementary to a portion of the opening to effectuate a tight seating engagement of the plunger member within the body member in the installed position of the device.

5 Claims, 10 Drawing Figures

PATENTED JUL 25 1972 3,678,798

INVENTOR
CLARENCE R. VAN NIEL
BY
Teare, Teare & Sammon
ATTORNEYS

PATENTED JUL 25 1972 3,678,798

INVENTOR
CLARENCE R. VAN NIEL
BY
Teare, Teare & Sammon
ATTORNEYS

FASTENING DEVICE

BACKGROUND OF THE INVENTION

This invention relates in general to fastening devices and deals, more particularly, with fastening devices of the blind assembly type for relatively permanent attachment to a support panel or the like.

More specifically, the present invention is directed to fastening devices which are designed for use alone or with stud members for supporting or attaching articles or panels to the supporting panel on which the fastening device is mounted. In addition, it has been desirable to develop a permanently retained type of fastening device which can be used to carry thrust in two opposite directions. For example, a typical application requiring such two way thrust would be in the crating of articles, wherein the stud member may be initially used to attach the article to the crate and then later used as a leveling leg device for the article, such as for use in appliances and the like. In another instance, it may be desirable to remove the stud member and use the fastening device alone as a plastic foot or pad for the article.

SUMMARY OF THE INVENTION

The present invention contemplates providing a fastening device for use in mounting within the aperture in a support panel comprising a deformable body member adapted for mounting with the support member. A plunger member is mounted on the body member adapted for insertion into an opening provided in the body member. The plunger member has a configuration which is generally complementary to a portion of the opening for tight seating engagement of the plunger member within the body member in the installed position of the device. The plunger member includes locking means disposed adjacent one end thereof, and cam means are carried by the body member for snap-action interlocking engagement with the locking means. In addition, the device is formed as a unitary, one-piece structure with the plunger member initially mounted in superposed relation with respect to the body member. The body member is generally loop-like in configuration including a head and spaced resilient leg members which are integrally connected at one end remote from the head defining therebetween the opening in the body member. The plunger member is disposed in generally axial alignment with the opening in the body member and is interconnected to the body member by a web means which is adapted for severance upon movement of the plunger member in a direction towards the body member. The plunger member is generally wedge-shaped in configuration and includes oppositely disposed side walls inclined toward one another in a direction towards the body member. The cam means comprises opposed cam surfaces adjacent one end of the opening for camming coaction with the locking means upon insertion of the plunger member into the body member. The cam surfaces are disposed in generally parallel relation with respect to the side walls of the plunger member being adapted for tight seating engagement therewith in the installed position of the device. The body member includes opposed projections disposed interiorly of the opening for interlocking engagement with the locking means to secure the plunger member within the body member. The locking means is disposed adjacent the connected end of the plunger member being adapted for sliding coacting engagement with the cam means upon insertion of the plunger member into the body member.

As can be seen, there is provided a uniquely structured fastening device which enables facile connection within an aperture in a support panel. The configuration of the components of the device enable the respective members to be essentially permanently retained therein and provide for the application of thrust to the device in two opposite directions when used with an article supporting member, such as a stud or the like. In addition, the device can be used alone without a stud member to provide a foot or pad which can be permanently mounted on an article, such as an appliance or the like.

DESCRIPTION OF THE PREFERRED EMBODIMENTS

Figure 1:
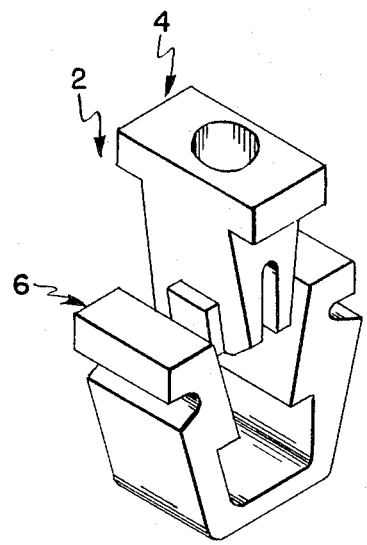
FIG. 1 is a generally perspective view of the fastening device of the present invention.
Figure 2:
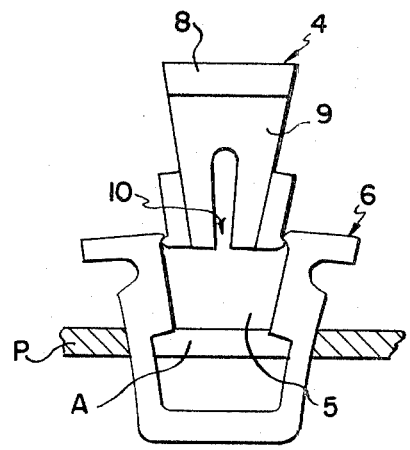
FIG. 2 is a front elevation view of the fastening device illustrated in FIG. 1.
Figure 4:
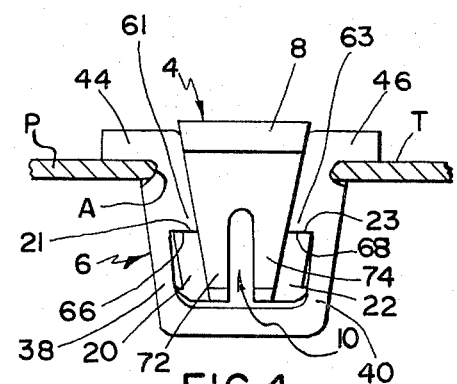
FIG. 4 is a front elevation view of the fastening device illustrated in FIG. 1 shown in the finally installed position with a support panel.

Referring now to FIG. 1, the fastening device of the present invention is illustrated in perspective, generally at 2, being adapted for assembly within an aperture A in a support member, such as a panel P or the like (FIGS. 2 and 4). As shown in FIG. 2, the device is of the blind-rivet type and is preferably formed as a unitary, one-piece member, such as by molding or other such forming techniques, as known in the art. In the form shown, the device 2 includes a plug-like plunger member 4 which is adapted for integral connection to a deformable loop-like body member 6. The body member 6 includes a generally vertically oriented opening 5 which is adapted to receive the plunger member in seated engagement in the finally installed position of the device (FIG. 4). Referring again to FIG. 2, the body of the plunger member 4 is shown as being generally wedge-shaped in configuration, including a head 8 adjacent the upper end and an integral shank 9 depending downwardly therefrom having a deformable, cam-like locking means 10 at the end remote from the head adapted for locking the plunger member 4 in snap-action relation within the loop-like body member 6 (FIG. 4).

Figure 7:
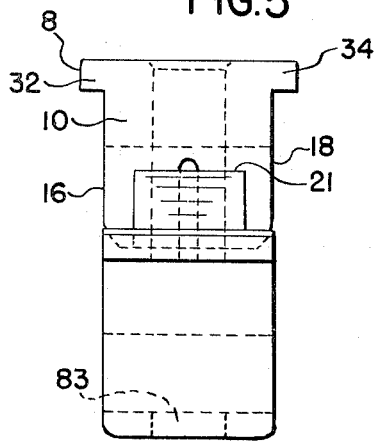
FIG. 7 is a side elevation view of the device shown in FIG. 6.
Figure 6:
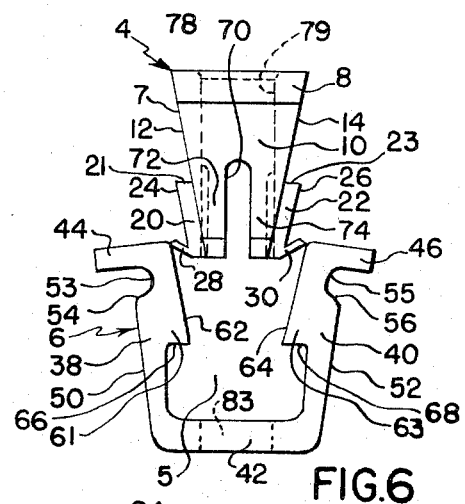
FIG. 6 is a front elevation view of the device shown in FIG. 1 in the initial condition of the device before installation.

Referring now to FIGS. 6 and 7, the body of the plunger member 4 is defined by opposed generally planar side walls 12 and 14 which are inclined toward one another in a direction away from the head 8 and a pair of generally parallel front and rear walls 16 and 18 which extend generally perpendicularly between the side walls 12 and 14.

The locking means 10 includes a pair of opposed padlike locking elements 20 and 22 adjacent the end of the shank remote from the head, and which project outwardly away from the side walls 12 and 14, respectively, defining therewith a pair of generally planar shoulders 21 and 23 adapted for interlocking engagement with the loop-like body member 6. As shown, the locking elements 20 and 22 include generally planar cam surfaces 24 and 26, respectively, which are disposed in generally parallel relationship with respect to the side walls 12 and 14 adapted for camming engagement with the loop-like body member 6 upon axial movement of the plunger member 4 with respect thereto.

Frangible web members 28 and 30 project outwardly from the locking elements 20 and 22, respectively, and integrally connect the plunger member 4 to the body member 6. Preferably, the web members 28 and 30 are disposed adjacent the lower distal end of the shank 9 to position the plunger member 4 in axial aligned, superposed relation with respect to the opening 5 being adapted to be severed upon vertical downward movement of the plunger member into the loop-like body member 6.

As shown in FIG. 7, the head 8 is defined by a pair of oppositely extending flanges 32 and 34 which project outwardly from the front 16 and rear 18 walls, respectively. Preferably, the transverse width of the plunger member adjacent the flanges 32 and 34 is greater than the maximum transverse width of the loop-like body 6 between the walls 16 and 18 so that the flanges 32 and 34 will overlie the top surface T of the panel member P in the finally installed position of the device (FIG. 4).

The loop-like body member 6 is preferably generally U-shaped in configuration, when viewed in front elevation (FIGS. 2 and 6), and includes a pair of oppositely disposed, generally vertically extending resilient legs 38 and 40 which are adapted to be deformed outwardly upon insertion of the plunger member 4 into the opening 5. The legs 38 and 40 are joined at the end remote from the plunger member 4 by a bight portion 42 which together with the legs 38 and 40 defines the opening 5. The legs 38 and 40 are each provided at their upper ends with integral flanges 44 and 46, respectively, which project laterally outwardly away from one another forming a split head-like portion adapted for overlying seating engagement with the upper confronting surface T of the support panel P in the preassembled position of the device (FIG. 3), as well as, for holding the device in position on the panel in the finally installed position of the device (FIG. 4). In addition, the flanges 44 and 46 may be inclined slightly downwardly in a direction toward the legs 38 and 40 to provide a resilient, spring-like gripping action with the support panel.

Figure 3:
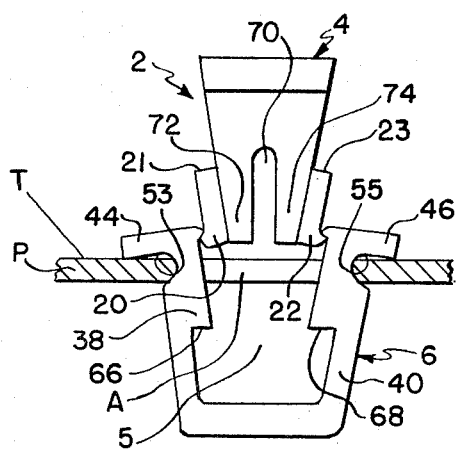
FIG. 3 is a front elevation view of the fastening device illustrated in FIG. 1 shown in the preassembled position with a support panel.

Preferably, the exterior surfaces 50 and 52 of the legs 38 and 40, respectively, are inclined toward one another in a direction away from the flanges 44 and 46 being adapted for camming engagement with the marginal edge of the aperture A to urge the legs 38 and 40 inwardly toward one another upon positioning of the loop-like body 6 in the preassembled position (FIG. 3). As shown, widthwise extending recesses 53 and 55 are provided adjacent the flanges 44 and 46 and define with the upper end of the surfaces 50 and 52 a pair of opposed shoulders 54 and 56. By this arrangement, the legs 38 and 40 may be deformed inwardly upon camming engagement of the surfaces 50 and 52 with the marginal edge of the aperture A, and then, upon continued movement of the loop-like body through the aperture A, the marginal edge of the panel P will pass beyond the shoulders 54 and 56 to enable the legs to snap outwardly and seat the marginal edge of the aperture A within the recesses 53 and 55 (FIG. 3).

Preferably, the interior of the loop-like body is provided with a pair of oppositely disposed projections 61 and 63 which extend inwardly into the opening 5 from the legs 38 and 40, respectively. As shown, the opening 5 is defined in its upper portion by inclined surfaces 62 and 64 which are adapted for cooperating camming engagement with the locking elements 20 and 22 of the plunger member 4. The opening 5 is enlarged at the lower end of the loop-like body 6 to define generally planar locking surfaces or shoulders 66 and 68 adjacent the lower extremity of the projections 61 and 63 adapted for interlocking engagement with the locking elements 20 and 22, respectively. In the form shown, the surfaces 62 and 64 are inclined at an angle with respect to the longitudinal central axis of the loop-like body 6 substantially equal to the angle of inclination between the side walls 12 and 14 and the longitudinal central axis of the plunger member 4. In addition, the maximum transverse distance between the surfaces 24 and 26 of the locking elements 20 and 22 is greater than the minimum transverse distance between surfaces 62 and 64 of the projections 61 and 63 so that the surfaces 24 and 26 will disposed flush against the surfaces 62 and 64 for sliding movement therealong upon axial movement of the plunger member into the opening 5. As can be seen, by this arrangement, the locking elements 20 and 22 will cammingly coact with the projections 61 and 63 to urge the legs 38 and 40 apart as the plunger member is driven into the opening 5, and then, the legs will snap back to a position where the shoulders 21 and 23 are disposed in interlocking flush abutting engagement with the shoulders 66 and 68 of the projections 61 and 63 to securely hold the plunger member 4 in seated relation within the opening 5 in the loop-like body 6. Preferably, the general plane of the shoulders 21, 23, 66 and 68 is generally perpendicular to the central axis of the device in the finally installed position for permanent retention of the device with the support panel (FIG. 4).

Preferably, the body 7 of the plunger member 4 is provided with an axially extending cut-out portion 70 which defines a pair of spaced legs 72 and 74, which extend downwardly adjacent the lower end of the shank 9. By this arrangement, the shank is deformable adjacent the end remote from the head to enable the legs 72 and 74 to be deformed inwardly toward one another upon engagement of the locking elements with the projections 61 and 63 as the plunger member 4 moves into the opening 5. This deformation will occur simultaneously with the outward deformation of the legs 38 and 40, and thus, it is preferred that the resiliency of the legs 72 and 74 be somewhat less than that of the legs 38 and 40 to give greater rigidity to the plunger member 4 than that of the body member 6.

Figure 5:
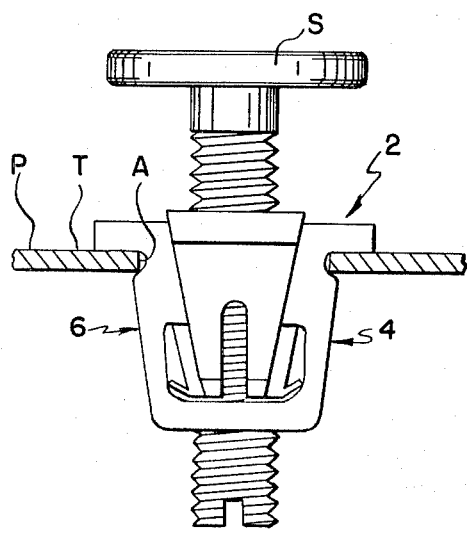
FIG. 5 is a front elevation view of the fastening device of the present invention shown mounted with a support panel in the finally installed position and having a stud member mounted thereon.
Figure 8:
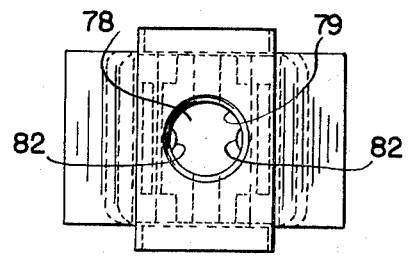
FIG. 8 is a top plan view of the device shown in FIG. 6.

Referring now also to FIGS. 5 and 8, the body of the plunger member 4 may be provided with an axially extending bore 78 which is defined by a generally cylindrical wall 79, and which is adapted to receive a stud member S therein. The bore 78 may be tapped or untapped so as to be used with either a threaded or unthreaded member S. In the case of an unthreaded bore, longitudinally extending ribs, such as at 82, may be provided along the wall 79 which project outwardly into the bore 78 for threaded engagement with the threads of the stud member S. An aperture 83 may be disposed in the bight portion in axial alignment with the bore 78 to enable the stud member S to pass completely through the loop-like body member 6. Again, the aperture 83 may be either threaded or unthreaded for use with either a threaded or unthreaded stud member.

Figure 9:
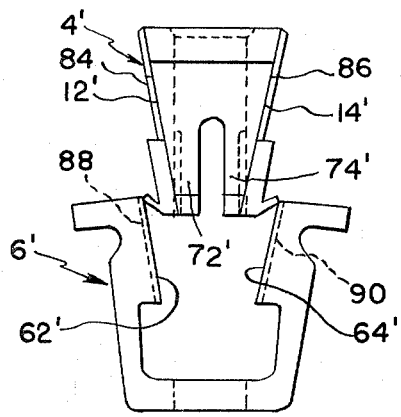
FIG. 9 is a side elevation view of a modified form of the device illustrated in FIGS. 1–8.
Figure 10:
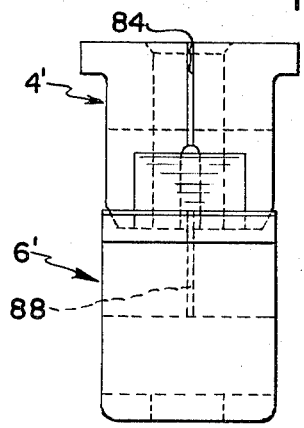
FIG. 10 is a side elevation view of the device shown in FIG. 9.

Referring now to FIGS. 9 and 10, there is illustrated another embodiment of the present invention. As shown, the plunger member 4' may be provided with oppositely disposed elongated ribs 84 and 86 which project outwardly from the side surfaces 12' and 14', respectively. As shown, the ribs 84 and 86 extend lengthwise in the direction of movement of the plunger member 4' with respect to the body member 6'. Complementary configured grooves or recesses 88 and 90 may be provided adjacent the inclined surfaces 62' and 64' in aligned relation with respect to ribs 84 and 86 for receiving the ribs therein in the seated installed position of the plunger member 4' to prevent lateral shifting movement of the plunger member with respect to the loop-like body member 6'.

Conveniently, the device 2 may be readily employed for use with any suitable work structure, such as the panel P. Referring to FIGS. 2, 3, and 4, in application, the loop-like body member 6 is simply inserted through the aperture A, such as by hand. As the member 6 passes through the aperture A, the exterior surfaces 50 and 52 cammingly engage the marginal edge of the aperture A to deform the legs 38 and 40 inwardly toward one another (FIG. 2). When the panel P passes above the shoulders 54 and 56, the legs 38 and 40 snap outwardly to interlock the marginal edge of the panel within the recesses 53 and 55, and therefore, seat the device in the preassembled position (FIG. 3). With the body member 6 in this pre-assembled position, a force, such as a blow by a suitable implement, may be applied to the plunger member 4 in a generally vertically downward direction to cause the plunger member 4 to move axially with respect to the body member 6, and further cause the web members 28 and 30 to be severed. When the plunger member 4 is moved to a position within the opening such as to cause the cam surfaces 24 and 26 to engage the inclined surfaces 62 and 64, the legs 38 and 40 will be urged outwardly in a direction away from one another to enable further passage of the plunger member 4 into the opening 5. As the plunger member continues to move downwardly, the axial slot 70 in the plunger member 4 enables the legs 72 and 74 adjacent the lower end of the shank to be urged inwardly toward one another simultaneously with deformation of the legs 38 and 40. When the locking elements 20 and 22 pass beyond the projections 61 and 63 the legs will snap inwardly toward one another, and the legs 72 and 74 will snap outwardly away from one another so that the shoulders 67 and 69 of the locking elements 20 and 22 will be disposed in flush, abutting interlocking engagement with the shoulders 66 and 68, respectively. In this position, the side surfaces 12 and 14 will be disposed in confronting flush, seated engagement with the correspondingly inclined surfaces 62 and 64 to firmly hold the plunger member 4 within the body member 6 (FIG. 4).

The modified device 4' shown in FIGS. 9 and 10 operates essentially the same as the device 4 shown in FIGS. 1–8, except in the modified form, the ribs 84 and 86 will snap into the recesses 88 and 90, respectively, when the legs 72' and 74' snap outwardly upon movement of the shoulders 21 and 23 downwardly past the shoulders 66 and 68.

I claim:

1. A fastening device adapted for insertion through an aperture in a panel comprising:
   a deformable loop-like body member adapted for mounting with said support member; said body of a substantially V-shaped configuration defining an opening at the unconnected ends of its legs, said body member having exterior panel receiving grooves adjacent said opening which receive said panel therein when said body member is inserted connected leg end first through said aperture causing the legs of said V-shaped body member to flex inwardly;
   a plunger member mounted on said body member adapted for insertion into said opening, said plunger member having a portion configured generally complementary to said opening for seating engagement of said plunger member within said body member and carrying cam-like locking means adapted for interlocking in snap-action relation said plunger member with said body member in the installed position of said device, said plunger member being initially integrally connected to said body member adjacent one end thereof adapted to be sheared therefrom and moved into said body member, said plunger member being partially deformable adjacent the connected end to facilitate insertion of said plunger member into said body member;
   said plunger member of a generally wedge-shaped configuration, in front elevation, including oppositely disposed side walls inclined toward one another in a direction toward said body member; and
   said opening being tapered adjacent the unconnected ends of said legs of said body member and conforming to the configuration of said plunger member to effectuate relatively permanent seating engagement of said plunger member within said loop-like body member in the installed position of said device.

2. A fastening device in accordance with claim 1 including means adapted for interlocking said plunger member with said body member to prevent lateral shifting movement of said plunger member with respect to said body member in the installed position of said device.

3. A fastening device in accordance with claim 2 wherein said means includes complementary configured portions on said plunger member and said body member adapted for engagement with one another in seated installed position of the plunger member to prevent lateral shifting movement of said plunger member with respect to said body member.

4. A fastening device in accordance with claim 3 wherein said complementary configured portion comprise a rib and a recess in aligned relation with respect to said rib for receiving the rib therein in seated installed position of the plunger member to prevent lateral shifting movement of said plunger member with respect to the body member.

5. A fastening device in accordance with claim 1 wherein said plunger member having a bore extending axially therethrough,
   said connected end of the body member having an aperture disposed in axial alignment with said bore, and
   said bore and said aperture adapted to receive a stud member therethrough in the installed position of said device.

* * * * *